United States Patent
Lin et al.

(10) Patent No.: US 8,356,344 B2
(45) Date of Patent: Jan. 15, 2013

(54) PORTABLE ICE PROXY AND METHOD THEREOF

(75) Inventors: Yi-Hsiang Lin, Taipei (TW); You-Hsin Yen, Taipei (TW); Chuan-Hung Lin, Taipei (TW)

(73) Assignee: D-Link Corporation, Taipei (TW)

( * ) Notice: Subject to any disclaimer, the term of this patent is extended or adjusted under 35 U.S.C. 154(b) by 1101 days.

(21) Appl. No.: 12/071,826

(22) Filed: Feb. 27, 2008

(65) Prior Publication Data

US 2009/0138961 A1    May 28, 2009

(30) Foreign Application Priority Data

Nov. 23, 2007  (TW) ............................. 96144406 A

(51) Int. Cl.
- G06F 9/00 (2006.01)
- G06F 15/16 (2006.01)
- G06F 17/00 (2006.01)

(52) U.S. Cl. ......... 726/12; 726/2; 726/3; 726/4; 726/11; 726/13; 726/14; 726/15; 726/26; 726/27; 726/28; 726/29; 726/30

(58) Field of Classification Search .................. 726/1–4, 726/11–15, 26–30
See application file for complete search history.

(56) References Cited

U.S. PATENT DOCUMENTS

| | | | | |
|---|---|---|---|---|
| 5,537,548 A | * | 7/1996 | Fin et al. | 709/204 |
| 2006/0272009 A1 | * | 11/2006 | Stott | 726/3 |
| 2007/0076729 A1 | * | 4/2007 | Takeda | 370/401 |
| 2008/0080568 A1 | * | 4/2008 | Hughes et al. | 370/519 |
| 2009/0006633 A1 | * | 1/2009 | Moore et al. | 709/228 |
| 2009/0122722 A1 | * | 5/2009 | Lin et al. | 370/254 |
| 2009/0262668 A1 | * | 10/2009 | Hemar et al. | 370/260 |
| 2010/0217874 A1 | * | 8/2010 | Anantharaman et al. | 709/228 |
| 2010/0312880 A1 | * | 12/2010 | Veits | 709/224 |

FOREIGN PATENT DOCUMENTS

CN    101465784 A  *  6/2009

* cited by examiner

*Primary Examiner* — Eleni Shiferaw
*Assistant Examiner* — Jing Sims
(74) *Attorney, Agent, or Firm* — Bacon & Thomas, PLLC

(57) ABSTRACT

This invention is to provide a method applied to a network system comprising Internet and at least two private networks each having at least one NAT router and at least one network terminal device. Each network terminal device can link to Internet through an ICE proxy and the NAT router in the corresponding private network. The method allows an ICE proxy in a private network to hijack connection signals sent from a network terminal device, to write a plurality of candidate access points provided by an ICE protocol standard into a SDP packet containing the connection signals, and to transmit the SDP packet to a remote ICE proxy in another private network via Internet. As a result, the ICE proxies of two private networks can selectively use the candidate access points provided by the ICE protocol standard in order to pass through the respective NAT routers and firewalls thereof.

2 Claims, 4 Drawing Sheets

PORTABLE ICE PROXY AND METHOD THEREOF

FIELD OF THE INVENTION

The present invention relates to a proxy and a method thereof, and more particularly to a portable ICE (Interactive Connectivity Establishment) proxy and a method thereof for enabling the ICE proxies of two private networks to pass through NAT router and a firewall of the two private networks and build up a connection channel therebetween via Internet for linking with each other.

BACKGROUND OF THE INVENTION

Recently, with speedy developments of computer and telecommunication technologies, services of transmitting voices, information, images, or other messages via public networks have become a major direction of business development for various Internet service providers (ISP). For example, in Next Generation Networks (NGN), Internet service providers provide voices, data, multi-media, and other comprehensively open network services via telecommunication service networks. Generally, NGN combines networks of voices, information, multi-media, and mobile services, and NGN can be divided into several layers in terms of network level, as follows:

(1) Access layer: It comprises various gateways, intelligent access terminal equipments, and comprehensive access equipments. The access layer uses various access means (such as broadband access, mobile access, etc.) to link various users to networks, and convert information formats into online-transmittable information formats.

(2) Transport layer: It is a loading network of NGN, and used to provide a public transmission platform for various services and media flows. In the transport layer, transmission is generally done in groups, and a core transmission network of the transport layer is a broadband IP network.

(3) Control layer: It is used to substantially carry out processing control of calling, adaptation of access protocol, inter-linkage, inter-communication, and other comprehensive control processing functions and services logics. The control layer determines services received by users, and controls service-flow processing of low-level network elements. A physical embodiment of the control layer is a softswitch equipment.

(4) Service layer: It is used to process service logics, provide comprehensively intelligent services for users, and carry out service customization and service-related management functions (such as service authentication and service charging).

Because a core loading network and a broadband access of the NGN are based on the existing IP network framework, access users must go through an addressing procedure of IP addresses. However, due to rapid inflation of Internet, IP addresses are in a seriously exhausted state. To solve the foregoing problem, many business networks and local networks are installed with a Network Address Transfer (NAT) at network outlets thereof. NAT is an Internet standard defined in RFC1631. Basically, NAT is installed in a router and located in a border area between a private network and a public network, in order to execute a translating procedure of IP address for packets sent by network terminal devices in the private network, so that a plurality of network terminal devices in the private network can share a common IP address for linking to Internet. In other words, when an IP information packet sent from the private network is transmitted to a NAT equipment, NAT is used to translate an internal IP address of the private network into a legal IP address of the public network. When external information is transmitted to the NAT equipment, NAT firstly checks information in a mapping table stored therein, and then translates an IP address of the public network into an IP address of the private network, which will be further transmitted to an internal receiving point. Generally, for normal information packets, the NAT equipment only translates IP addresses and port numbers. But, for applications conforming to the H.323 standard, the SIP (Session Initiation Protocol) standard, and the MGCP (Media Gateway Control Protocol) standard, actual media connection information is stored in packet information for being transmitted. As a result, there will be some problems as follows: Suppose a network terminal device A (such as a computer having a network interface, a network video camera, and a VoIP phone) sends a calling signal to another network terminal device B, a calling information of the network terminal device A will be transmitted to the network terminal device B via protocols such as H.323, SIP, etc. Then, the network terminal device B can obtain a private network IP address of the network terminal device A from a packet information (calling information), and try to establish a RTP (real-time transport protocol) connection with the network terminal device A. However, because the IP address is a private address which can not be recognized on the public network, the network terminal devices A and B can not establish a communication connection therebetween. Therefore, NAT only allows an internal network terminal device to establish outgoing communication connections, but doesn't allow a network terminal device outside the network to establish communication connections with a network terminal device inside the network. As a result, although NAT serves to protect network safety, NAT also blocks communication signals (such as VoIP phone signals) from external networks. Thus, NAT protocol may become a technological barrier for business users to use network communication services (such as VoIP phones).

Additionally, in order to increase the safety of internal networks, most businesses use firewalls at network outlets to limit the types and flow of information packets entering the internal network. Based on the voice and video communication protocols of IP, IP addresses and port numbers must be used between network terminal devices for building up channels of information communication. As a result, it causes a dilemma problem, i.e., each network terminal device of a NGN must detect external calling signals at all times, but the firewalls will not allow uninvited information packets from external networks to pass through. Thus, some mechanism must be used to open a port of the firewalls for transmitting calling signals from external networks to a network terminal device of the internal network. According to the RTP/RTCP (Real-time Transport Control Protocol) in voice and video communications, the sending and receiving of media flows can only be carried out through dynamic allocation of ports. Therefore, the foregoing problem with firewalls becomes another technological barrier for business users to use network communication services (such as VoIP phones).

In view of the problems described above, network and software providers (such as Microsoft and Cisco) are cooperating with each other to develop a new protocol for Interactive Connectivity Establishment (ICE) intended for application software (such as Microsoft application software), so that the application software, when installed in a network system using the NAT protocol, can allow network terminal devices of an internal network and an external network to exchange data in a controlled manner, for the purpose of carrying out network communication services (such as VoIP phones). However, this method only can be applied between network terminal devices of a NGN which are installed with ICE application software. For the majority of network terminal devices that do not have ICE application software, or for the majority of private networks that have not yet install ICE application software, the NAT equipment and firewalls thereof will try to protect the networks by blocking communication signals from external networks. As a result, the network terminal devices still cannot exchange data there between, and the network communication services still can not be carried out.

Therefore, it is important for Internet service providers to figure out how to develop a portable ICE proxy to allow ICE proxies from two private networks to selectively use a plurality of candidate access points provided by an ICE protocol standard in order to pass through respective NAT routers of the private networks and firewalls thereof, and to build up a barrier-free connection channel between the ICE proxies via a public network for linking to each other and for accessing information from network terminal devices in the respective private networks.

SUMMARY OF THE INVENTION

Therefore, after time-consuming researches and experiments by the inventor, a portable ICE proxy and a method thereof are finally developed which solve the problems described above and allow ICE proxies from two private networks to selectively use a plurality of candidate access points provided by an ICE protocol standard in order to pass through respective NAT routers of the private networks and firewalls thereof, and to build up a barrier-free connection channel between the ICE proxies via a public network for linking to each other and for accessing information from network terminal devices in the respective private networks.

A primary objective of the present invention is to provide a portable ICE proxy and a method thereof, which can be applied to a network system comprising Internet and at least two private networks, wherein each of the two private networks comprises at least one NAT router and at least one network terminal device (such as a computer having a network interface, a network video camera, and a VoIP phone). Each of the at least one network terminal device can link to Internet through an ICE proxy and one of the at least one NAT router in the corresponding private network. The method allows an ICE proxy in a private network to hijack connection signals sent from a network terminal device in the corresponding private network, to write a plurality of candidate access points provided by an ICE protocol standard into a SDP (Session Description Protocol) packet containing the connection signals, and to transmit the SDP packet to a remote ICE proxy in another private network via Internet. As a result, the ICE proxies of the at least two private networks can selectively use the plurality of candidate access points provided by the ICE protocol standard in order to pass through the respective NAT routers and respective firewalls thereof, thereby building up a barrier-free connection channel between the ICE proxies for linking to each other and for accessing information from network terminal devices in the two private networks.

A secondary objective of the present invention is to provide a portable ICE proxy which is connected to a network terminal device and a NAT router respectively, and comprises a storing means, a first input/output port, a detecting means, a processing means, and a second input/output port. The storing means is used to store a plurality of candidate access points provided according to an ICE protocol standard by the ICE proxy comprising the storing means, an external ICE proxy, or a network terminal device conforming to the ICE protocol standard. The first input/output port is connected to the network terminal device and serves to receive packets transmitted from the network terminal device, or transmit packets received by the ICE proxy to the network terminal device. The detecting means is used to detect and hijack a connection request sent from the network terminal device. The processing means is used to write the plurality of candidate access points provided by the ICE protocol standard into a SDP packet containing the connection request, according to the ICE protocol standard. The second input/output port is connected to the NAT router and serves to transmit packets generated by the ICE proxy to the NAT router, or receive packets transmitted from the NAT router. When the processing means receives another SDP packet transmitted from the NAT router, the processing means will read out a plurality of candidate access points provided by a remote ICE proxy in the another SDP packet, and select to pass through one of a plurality of candidate pathways according to the plurality of candidate access points provided by the remote ICE proxy for linking to each other, so that the ICE proxy can pass through the NAT router and a firewall thereof, and build up a connection channel with the remote ICE proxy via Internet for linking to each other.

A third objective of the present invention is to allow the respective ICE proxies to selectively use a point-to-point (p2p) means, a local relay, or a remote relay according to the plurality of candidate access points provided by the ICE protocol standard, in order to pass through the NAT routers and firewalls thereof in the respective private networks, and to build up a connection channel between the ICE proxies of the two private networks via Internet for linking to each other and for accessing information from the respective network terminal devices. As a result, network communication services between private networks can be easily carried out through the ICE proxy of the present invention without changing or re-setting the various hardware and software in the existing private networks.

The above and other objects, features and advantages of the present invention will become apparent from the following detailed description taken with the accompanying drawings.

BRIEF DESCRIPTION OF THE DRAWINGS

The structure and the technical means adopted by the present invention to achieve the above and other objectives can be best understood by referring to the following detailed description of the preferred embodiments and the accompanying drawings, wherein.

DETAILED DESCRIPTION OF THE PREFERRED EMBODIMENTS

A so-called "proxy", i.e. a relay server, is a network device used as a relay station in a network. Traditionally, the purpose of the relay station is to avoid possible control and monitor, or to speed up information access. To avoid control and monitor means that a user can have a computer plugged in to a proxy in a network when an Internet protocol address (i.e. IP address) of the computer is denied by a certain website, so that the computer can firstly link to the proxy, then use the proxy as a relay station in the network, and then link to the desired website via the proxy. Because the IP address of the computer is different from that of the proxy and the desired website doesn't deny the IP address of the proxy, the computer will successfully link to the website via the proxy for accessing information. A relay station can speed up information access because most proxies provide a buffering function, so that a proxy can be used as a large-scale cache memory having a huge storage space for continuously storing newly accessed data. If the data requested by a computer is already stored in a storage device of the proxy and the stored data is the newest, the proxy will not update data from a server of the website, but directly transmit the stored data in the storage device to the computer. Therefore, the browsing speed and efficiency of the computer will be substantially enhanced.

Figure 1:
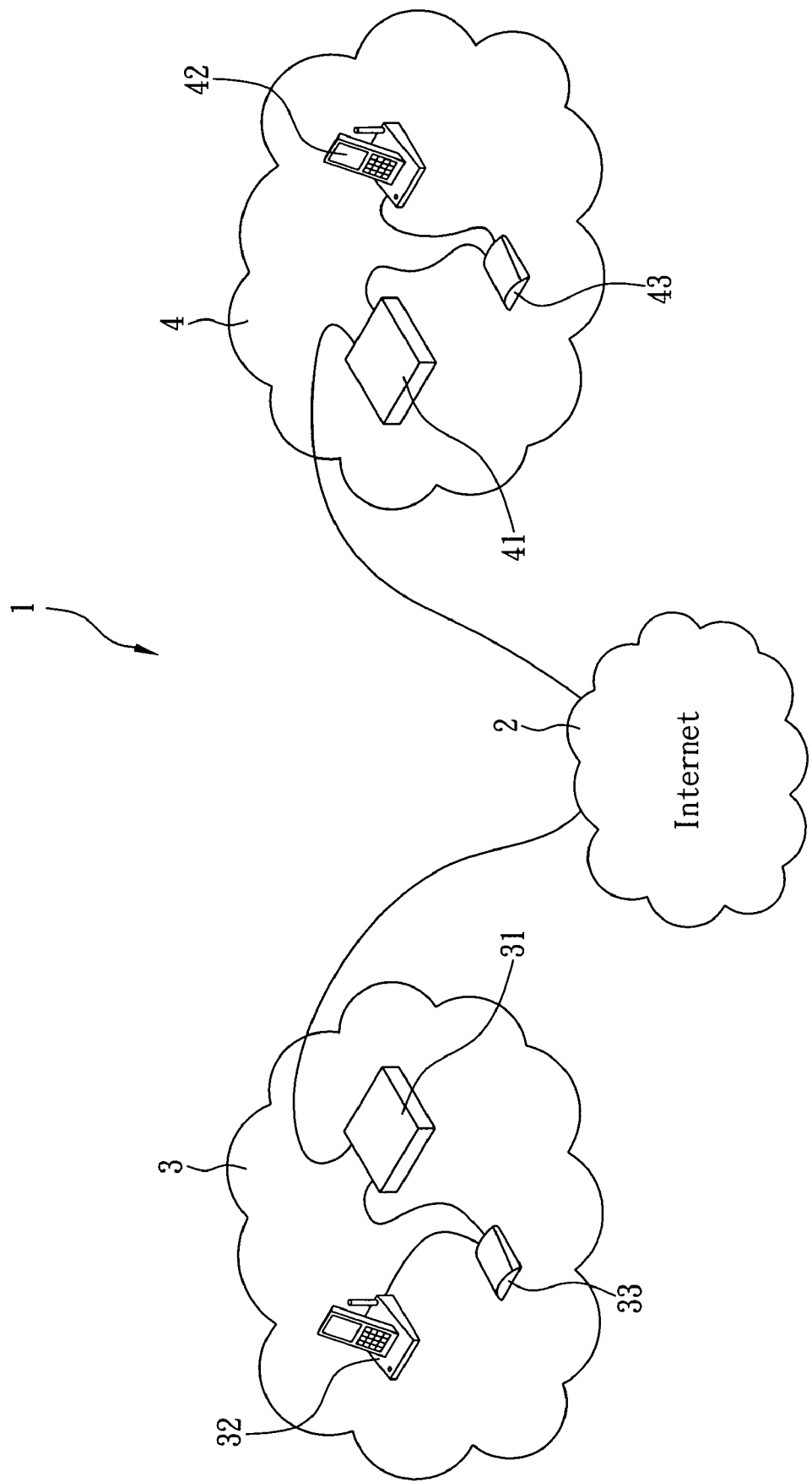
FIG. 1 is a schematic view of a network system according to the present invention.
Figure 2:
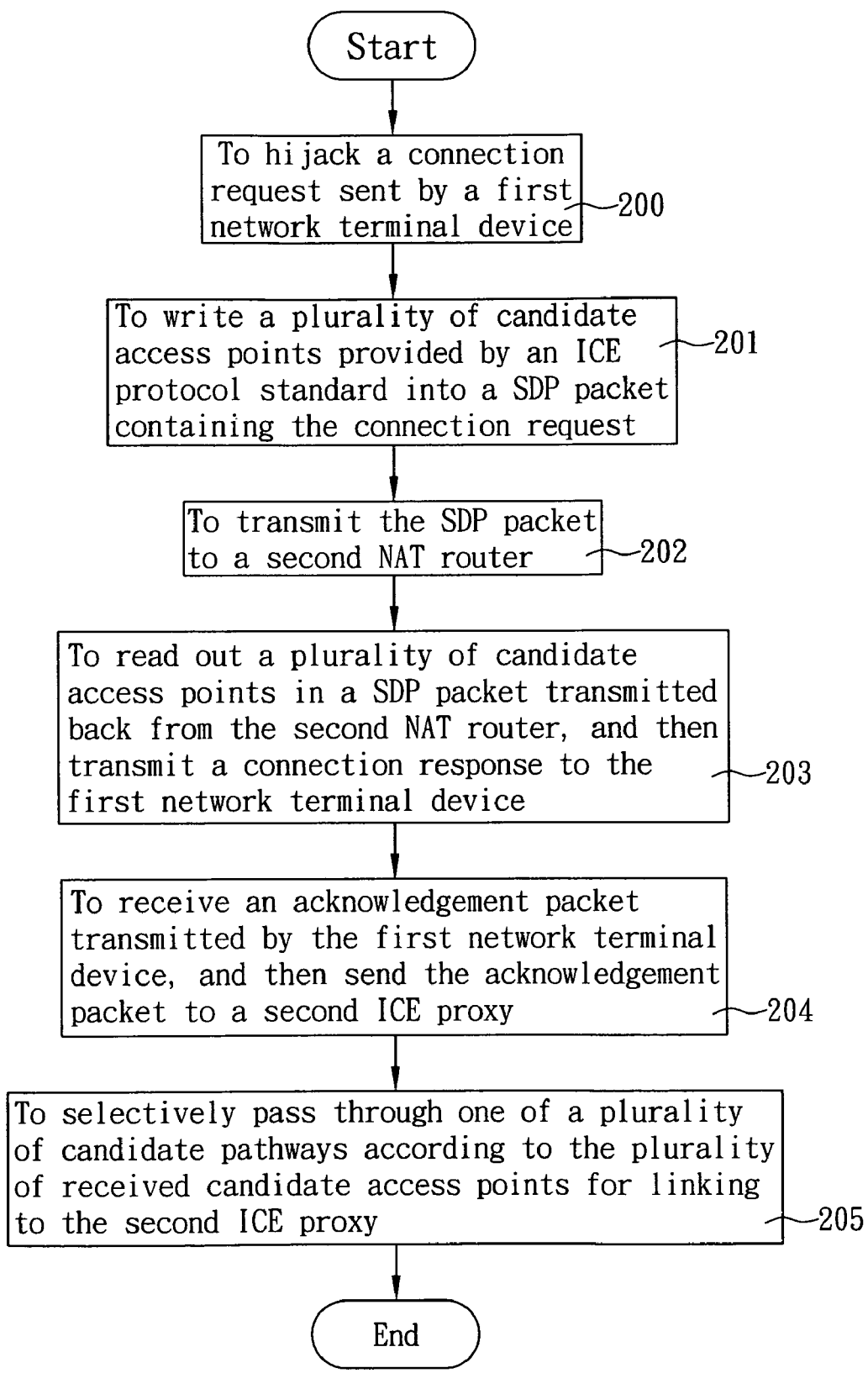
FIG. 2 is a flowchart of the present invention.

A portable ICE proxy and a method thereof according to the present invention are developed based on the foregoing operation principle of a proxy but not for the purposes of avoiding control and monitor or speeding up information access. By selectively using a plurality of candidate access points provided by the ICE protocol standard in the respective ICE proxies of two private networks, the respective ICE proxies can pass through corresponding NAT routers and firewalls thereof, and build up a barrier-free connection channel between the respective ICE proxies for linking to each other and for accessing information from network terminal devices in the respective private networks. Referring now to FIG. 1, the method according to a preferred embodiment of the present invention is applied to a network system 1. The network system 1 comprises Internet 2 and at least two private networks. In the preferred embodiment of the present invention, a first private network 3 and a second private network 4 are provided as an example. Each of the first and second private networks 3, 4 comprises at least one NAT router 31, 41 and at least one network terminal device 32, 42 (such as a computer having a network interface, a network video camera, and a VoIP phone). In the preferred embodiment of the present invention, the first private network 3 comprises a first NAT router 31 and a first network terminal device 32, while the second private network 4 comprises a second NAT router 41 and a second network terminal device 42. However, in alternative preferred embodiments of the present invention, the number of network terminal devices is not limited to that disclosed above and each of the private networks 3, 4 may comprise two or more network terminal devices. Each of the network terminal devices 32, 42 is linked to Internet 2 through an ICE proxy 33, 43 installed with an ICE protocol standard, and through the NAT router 31, 41 of the corresponding private networks 3, 4. The method allows the ICE proxies 33, 43 in the private networks 3, 4 to execute the following steps. Refer to FIG. 2. Because the ICE proxies 33, 43 execute the same steps, the following description is given with respect only to the first ICE proxy 33 of the first private network 3 for convenience sake.

In a step 200, the first ICE proxy 33 hijacks a connection request sent from the first network terminal device 32.

In a step 201, the first ICE proxy 33 writes a plurality of candidate access points provide by an ICE protocol standard into a SDP packet containing the connection request, according to the ICE protocol standard. In the preferred embodiment of the present invention, the plurality of candidate access points provided by the ICE protocol standard allow each of the ICE proxies 33, 43 to selectively use a point-to-point (p2p) means, a local relay, or a remote relay as a way of connection, in order to pass through the NAT router 31, 41 and a firewall thereof of the corresponding private network 3, 4, for linking to each other via Internet 2.

In a step 202, the first ICE proxy 33 transmits the SDP packet to the second NAT router 41 of the second private network 4 through the first NAT router 31 via Internet 2. The second ICE proxy 43 of the second private network 4 hijacks the SDP packet transmitted from the second NAT router 41, then reads out the plurality of candidate access points provided by the first ICE proxy 33 in the SDP packet, and then transmits the connection request to the second network terminal device 42. If the second network terminal device 42 accepts the connection request, the second network terminal device 42 generates a connection response. When the second ICE proxy 43 hijacks the connection response transmitted from the second network terminal device 42, the second ICE proxy 43 writes a plurality of candidate access points provided by the ICE protocol standard into a SDP packet containing the connection response, according to the ICE protocol standard, and then transmits the SDP packet to the first NAT router 31 of the first private network 3 through the second NAT router 41 via Internet 2.

In a step 203, the first ICE proxy 33 reads out the plurality of candidate access points provided by the second ICE proxy 43 in the SDP packet after receiving the SDP packet transmitted from the second NAT router 41, and then transmits the connection response to the first network terminal device 32.

In a step 204, the first ICE proxy 33 receives an acknowledgement packet transmitted from the first network terminal device 32, and then sends the acknowledgement packet to the second ICE proxy 43 of the second private network 4 via Internet 2.

In a step 205, the first ICE proxy 33 and the second ICE proxy 43 can select one of a plurality of candidate pathways for linking to each other according to the plurality of received candidate access points, so that the ICE proxies 33, 43 can pass through the respective NAT routers 31, 41 and a firewall thereof, and build up a barrier-free connection channel between the ICE proxies 33, 43 for linking to each other and accessing information from the network terminal devices 32, 42 of the private networks 3, 4.

Figure 3:
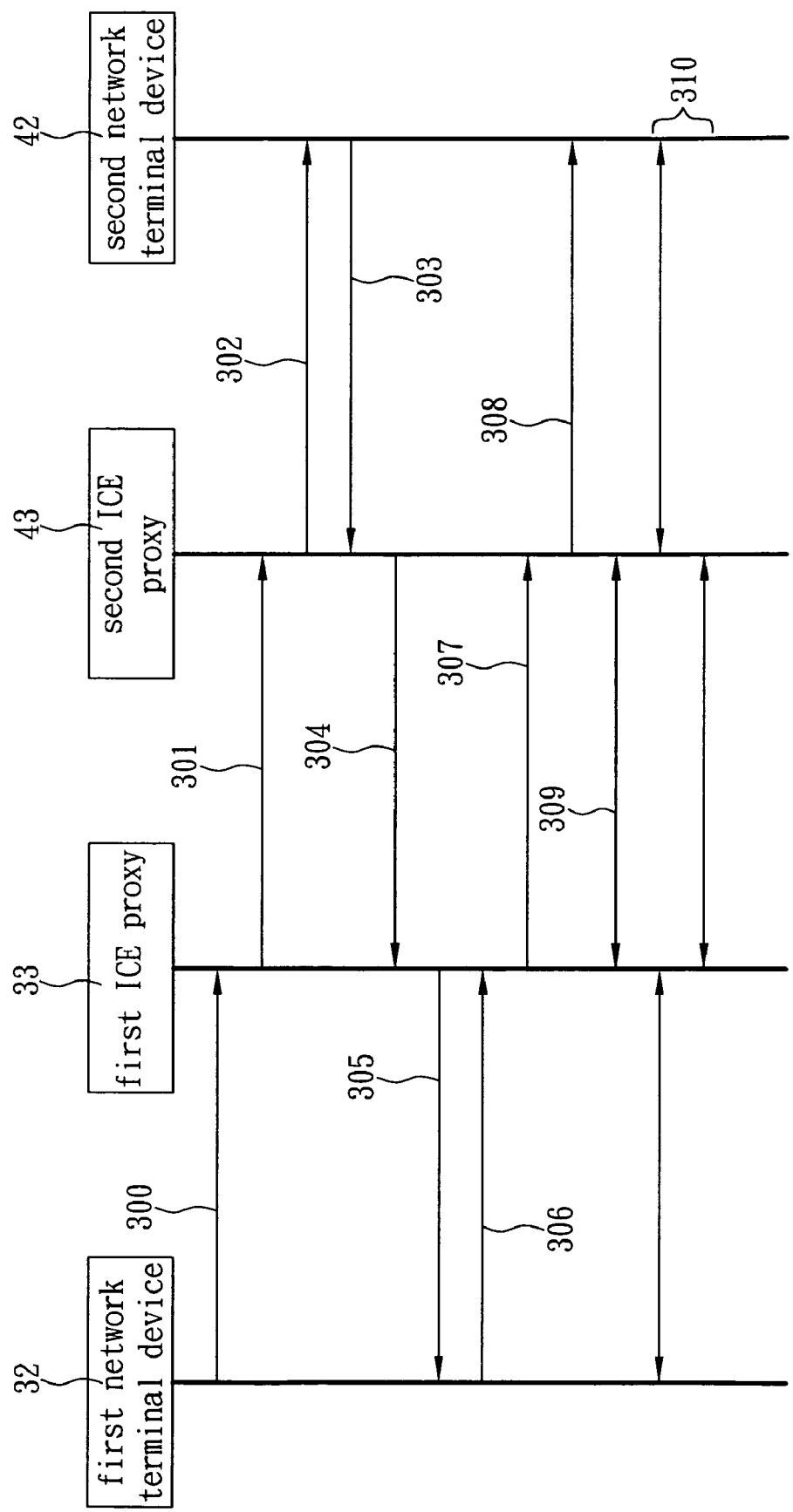
FIG. 3 is a chronological order diagram for building up a connection channel between a first ICE proxy and a second ICE proxy of a preferred embodiment of the present invention according to the flowchart of FIG. 2 for transmitting information to each other.

Referring back to FIG. 1, in the preferred embodiment of the present invention, the first network terminal device 32 and the second network terminal device 42 can be a VoIP phone, respectively. The first network terminal device 32 can link to Internet 2 through the corresponding first NAT router 31 via the first ICE proxy 33, while the second network terminal device 42 can link to Internet 2 through the corresponding second NAT router 41 via the second ICE proxy 43. Referring now to FIG. 3, which illustrates a chronological order diagram based on the foregoing steps for building up a connection channel between the first ICE proxy 33 and the second ICE proxy 43 for transmitting information to each other. The chronological order is described as follows:

In a step 300, when the first network terminal device 32 wants to execute a VoIP telephone communication, the first network terminal device 32 sends an invitation packet to the second network terminal device 42 via a SIP.

In a step 301, the first ICE proxy 33 hijacks the invitation packet sent from the first network terminal device 32, writes a plurality of candidate access points provided by the ICE protocol standard into a SDP packet containing the invitation packet, according to the ICE protocol standard, and then transmits the SDP packet to the second NAT router 41 of the second private network 4 through the first NAT router 31 via Internet 2.

In a step 302, the second ICE proxy 43 hijacks the SDP packet transmitted from the first network terminal device 32 to the second network terminal device 42, reads out the plurality of candidate access points provided by the first ICE proxy 33 in the SDP packet, and then transmits the invitation packet to the second network terminal device 42.

In a step 303, if the second network terminal device 42 accepts the connection invitation, the second network terminal device 42 sends an okay (OK) packet to the first network terminal device 32 via the SIP.

In a step 304, when the second ICE proxy 43 hijacks the OK packet transmitted from the second network terminal device 42, the second ICE proxy 43 writes a plurality of candidate access points provided by the ICE protocol standard into a SDP packet containing the OK packet, according to the ICE protocol standard, and then transmits the SDP packet to the first network terminal device 32 via Internet 2.

In a step 305, the first ICE proxy 33 hijacks the SDP packet transmitted from the second network terminal device 42 to the first network terminal device 32, reads out the plurality of candidate access points provided by the second ICE proxy 43 in the SDP packet, and then transmits the OK packet to the first network terminal device 32.

In a step 306, the first network terminal device 32 receives the OK packet, and then sends an acknowledgement packet to the second network terminal device 42.

In a step 307, the first ICE proxy 33 hijacks the acknowledgement packet, and then transmits the acknowledgement packet to the second network terminal device 42 via Internet 2.

In a step 308, the second ICE proxy 43 hijacks the acknowledgement packet, and then transmits the acknowledgement packet to the second network terminal device 42.

In a step 309, the first ICE proxy 33 and the second ICE proxy 43 each execute a connection test on the received plurality of candidate access points. When the first ICE proxy 33 and the second ICE proxy 43 confirm a connection status of the plurality of candidate access points to be correct, the first ICE proxy 33 and the second ICE proxy 43 can select one of a plurality of connection pathways for passing through the first NAT router 31 and the second NAT router 41, respectively, so as to build up a barrier-free connection channel between the first ICE proxy 33 and the second ICE proxy 43 for linking to each other.

In a step 310, when the first network terminal device 32 transmits a RTP information stream, the first network terminal device 32 transmits the RTP information stream to the first ICE proxy 33. After the first ICE proxy 33 receives the RTP information stream, the first ICE proxy 33 transmits the RTP information stream to the second ICE proxy 43 via the connection pathway now built up, and then the second ICE proxy 43 transmits the RTP information stream to the second network terminal device 42. Similarly, when the second network terminal device 42 transmits a RTP information stream, the second network terminal device 42 executes the same steps. Thus, it should be noted that the RTP information stream is transmitted between the network terminal devices 32, 42 of the two private networks 3, 4 entirely through the connection pathway built up between the two ICE proxies 33, 43. Therefore, a user can easily carry out network communication between private networks without upgrading or re-setting any hardware and software in the existing network terminal devices 32, 42 or the NAT routers 31, 41 in the two private networks 3, 4.

Figure 4:
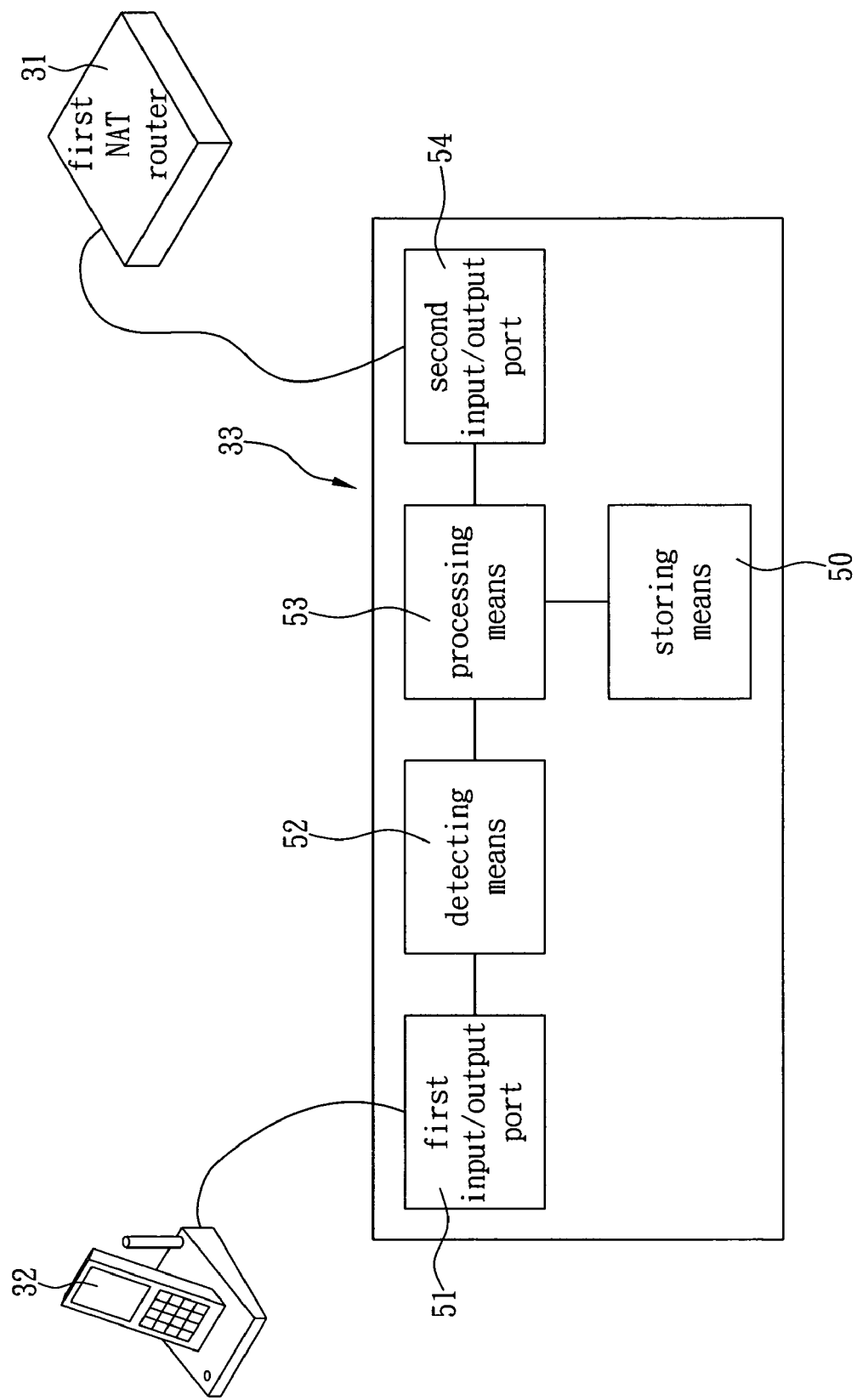
FIG. 4 is a schematic view of the ICE proxy according to the present invention.

As described above, referring to FIGS. 1 and 4, a first ICE proxy 33 of the present invention comprises a storing means 50, a first input/output port 51, a detecting means 52, a processing means 53, and a second input/output port 54. The storing means 50 is used to store a plurality of candidate access points provided according to a ICE protocol standard by the ICE proxy comprising the storing means, an external ICE proxy, or a network terminal device conforming to the ICE protocol standard. The first input/output port 51 is connected to a first network terminal device 32 and used to receive packets transmitted from the first network terminal device 32, or transmit packets received by the first ICE proxy 33 to the first network terminal device 32. The detecting means 52 is used to detect and hijack a SIP packet sent and received by the first network terminal device 32. The processing means 53 is used to write the plurality of candidate access points provided by the ICE protocol standard into a SDP packet containing the connection request, according to the ICE protocol standard; or to read out the plurality of candidate access points from the received SDP packet for executing a connection test according to the ICE protocol standard. The second input/output port 54 is connected to the first NAT router 31 and used to transmit packets generated by the first ICE proxy 33 to the first NAT router 31, or receive packets transmitted from the first NAT router 31. In the preferred embodiment of the present invention, when the processing means 53 receives another SDP packet transmitted from the first NAT router 31, the processing means 53 will read out a plurality of candidate access points provided by the second ICE proxy 43 in the another SDP packet, and select to pass through one of a plurality of candidate pathways for linking to the second ICE proxy 43 according to the plurality of candidate access points provided by the second ICE proxy 43, so that the first ICE proxy 33 can pass through the first NAT router 31 and a firewall thereof, thereby building up a connection channel with the second ICE proxy 43 via Internet 2 for linking to each other. However, the foregoing description is only a preferred embodiment of the present invention, and the present invention is not limited thereto in practice. Based on the foregoing design concept of the present invention, one skilled in the art can integrate the storing means 50, the detecting means 52, and the processing means 53 into a unit; or integrate the storing means 50 and the processing means 53 into a unit; or integrate the detecting means 52 and the processing means 53 into a unit without departing from the scope of the present invention. All such alterations and modifications are within the scope of the present invention as long as the resulting ICE proxies are designed to serve the foregoing design objectives of the present invention.

While the invention herein disclosed has been described by means of specific embodiments, numerous modifications and variations could be made thereto by those skilled in the art without departing from the scope and spirit of the invention set forth in the claims.

What is claimed is:

1. A method for building up a connection channel between network terminal devices by using a portable Interactive Connectivity Establishment (ICE) proxy, applicable to a network system comprising a first private network, a second private network and Internet, wherein said first and second private networks do not have ICE software installed therein and each of the first and second private networks comprises at least one Network Address Translation (NAT) router and at least one network terminal device that does not have ICE software installed therein, and each of the at least one network terminal device is linked to the Internet through an ICE proxy and a corresponding NAT router in the private network comprising the network terminal device, the method comprising the steps of:

- using the ICE proxy of the first private network which do not have ICE software installed therein to detect and hijack a connection request sent by one of the at least one network terminal device which do not have ICE software installed therein of the first private network, to write a plurality of candidate access points provided by an ICE protocol standard into a Session Description Protocol (SDP) packet containing the connection request according to the ICE protocol standard, and then to transmit the SDP packet to the ICE proxy of the second private network which do not have ICE software installed therein via Internet, wherein the candidate access points comprise a point-to-point (p2p) means, a local relay, and a remote relay for passing through the respective NAT routers and respective firewalls thereof of the first and second private networks;
- using the ICE proxy of the first private network to receive a SDP packet transmitted by one of the at least one NAT router in the second private networks, to read out a plurality of candidate access points provided by the ICE proxy of the second private network in the SDP packet, and then to transmit a connection response to the corresponding network terminal device in the first private network; and
- allowing the two ICE proxies to selectively pass through one of a plurality of candidate pathways for linking to each other according to the plurality of received candidate access points, so that the two ICE proxies each passes through the corresponding NAT router and the firewall thereof, thereby building up a connection channel between the two ICE proxies via Internet for linking to each other.

2. A portable Interactive Connectivity Establishment (ICE) proxy connected to a network terminal device and a Network Address Translation (NAT) router respectively, wherein said network terminal device does not have ICE application software installed therein, said ICE proxy comprising:

- a storing means for storing a plurality of candidate access points provided according to an ICE protocol standard, wherein the candidate access points comprise a point-to-point (p2p) means, a local relay and a remote relay for passing through the NAT router of a corresponding private network that does not have ICE application software installed therein, and for passing through a firewall of the corresponding private network;
- a first input/output port connected to the network terminal device for receiving packets transmitted from the network terminal device, or transmitting packets received by the ICE proxy to the network terminal device;
- a detecting means for detecting and hijacking a connection request sent by the network terminal device;
- a processing means for writing the plurality of candidate access points provided by the ICE protocol standard into a Session Description Protocol (SDP) packet containing the connection request according to the ICE protocol standard, or reading out a plurality of candidate access points from a received SDP packet for executing a connection test according to the ICE protocol standard; and
- a second input/output port connected to the NAT router for transmitting packets generated by the ICE proxy to the NAT router, or receiving packets transmitted from the NAT router;
- whereby, when the processing means receives another SDP packet transmitted from the NAT router, the processing means read out a plurality of candidate access points provided by a remote ICE proxy in the another SDP packet, transmit a connection response to the network terminal device, and select to passes through one of a plurality of candidate pathways for linking to the remote ICE proxy according to the plurality of candidate access points provided by the remote ICE proxy, so that the ICE proxy passes through the NAT router and the firewall thereof, thereby building up a connection channel with the remote ICE proxy via Internet for linking to each other.

* * * * *